United States Patent
Granstrom et al.

(10) Patent No.: US 10,198,441 B1
(45) Date of Patent: *Feb. 5, 2019

(54) REAL-TIME DUPLICATE DETECTION OF VIDEOS IN A MASSIVE VIDEO SHARING SYSTEM

(71) Applicant: Google LLC, Mountain View, CA (US)

(72) Inventors: Johan Georg Granstrom, Kilchberg (CH); Nicola Muscettola, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/356,505

(22) Filed: Nov. 18, 2016

Related U.S. Application Data

(63) Continuation of application No. 14/154,953, filed on Jan. 14, 2014, now Pat. No. 9,529,840.

(51) Int. Cl.
*G06F 17/30* (2006.01)

(52) U.S. Cl.
CPC .... *G06F 17/30038* (2013.01); *G06F 17/3002* (2013.01)

(58) Field of Classification Search
None
See application file for complete search history.

(56) References Cited

U.S. PATENT DOCUMENTS

| | | | |
|---|---|---|---|
| 8,094,872 B1 | 1/2012 | Yagnik et al. | |
| 8,195,038 B2 | 6/2012 | Liu et al. | |
| 8,229,219 B1 * | 7/2012 | Ioffe | G06F 17/30814 382/168 |
| 8,238,669 B2 * | 8/2012 | Covell | G06K 9/00758 382/181 |
| 8,347,408 B2 | 1/2013 | Rodriguez et al. | |
| 8,358,837 B2 | 1/2013 | Shakya et al. | |
| 8,611,422 B1 | 12/2013 | Yagnik et al. | |
| 8,838,609 B1 | 9/2014 | Sharifi et al. | |
| 8,947,595 B1 | 2/2015 | Tucker et al. | |
| 8,953,811 B1 | 2/2015 | Sharifi et al. | |
| 8,953,836 B1 | 2/2015 | Postelnicu et al. | |
| 8,965,863 B1 | 2/2015 | Kulkarni et al. | |
| 9,043,228 B1 | 5/2015 | Ross et al. | |
| 9,113,203 B2 | 8/2015 | Pora et al. | |
| 9,275,427 B1 | 3/2016 | Sharifi | |
| 2005/0044561 A1 | 2/2005 | McDonald | |
| 2008/0109369 A1 | 5/2008 | Su et al. | |
| 2009/0037967 A1 | 2/2009 | Barkan et al. | |

(Continued)

OTHER PUBLICATIONS

Rosebrock, A., "Fingerprinting Images for Near-Duplicate Detection," Real Python, Dec. 18, 2014, 14 Pages, can be retrieved at <URL:https://realpython.com/blog/python/fingerprinting-images-for-near-duplicate-detection/?>.

(Continued)

*Primary Examiner* — Debbie M Le
(74) *Attorney, Agent, or Firm* — Byrne Poh LLP

(57) ABSTRACT

Systems and methods for identifying duplicate media items in a media system are provided. In particular, media content can be uploaded to a serve. The media content can be fingerprinted. A digest is generated based on the fingerprint. The digest is indexed and potential matching media items are identified. Matches are determined from the potential matching media items.

20 Claims, 10 Drawing Sheets

(56) References Cited

U.S. PATENT DOCUMENTS

| | | |
|---|---|---|
| 2009/0037975 A1 | 2/2009 | Ishikawa et al. |
| 2009/0074235 A1 | 3/2009 | Lahr et al. |
| 2009/0157472 A1 | 6/2009 | Burazin et al. |
| 2009/0328237 A1 | 12/2009 | Rodriguez et al. |
| 2010/0262488 A1 | 10/2010 | Harrison et al. |
| 2011/0109769 A1 | 5/2011 | Bhatt et al. |
| 2012/0069131 A1 | 3/2012 | Abelow |
| 2012/0095958 A1 | 4/2012 | Pereira et al. |
| 2014/0074783 A1 | 3/2014 | Alsina et al. |
| 2014/0108946 A1 | 4/2014 | Olofsson |
| 2014/0129942 A1 | 5/2014 | Rathod |
| 2014/0259097 A1 | 9/2014 | Brock et al. |
| 2014/0344289 A1 | 11/2014 | Berenson et al. |
| 2015/0019578 A1 | 1/2015 | Granström |

OTHER PUBLICATIONS

U.S. Appl. No. 13/450,427, filed Apr. 18, 2012, entitled, "Full Digest of an Audio File for Identifying Duplicates," 24 pages.
U.S. Appl. No. 13/942,638, filed Jul. 15, 2013, entitled, "Determining a Likelihood and Degree of Derivation Among Media Content Items," 36 pages.
U.S. Appl. No. 14/160,723, filed Jan. 22, 2014, entitled, "Classification of Media in a Media Sharing System," 33 pages.
Notice of Allowance dated Aug. 26, 2016 in U.S. Appl. No. 14/154,953.
Office Action dated Mar. 24, 2016 in U.S. Appl. No. 14/154,953.

\* cited by examiner

REAL-TIME DUPLICATE DETECTION OF VIDEOS IN A MASSIVE VIDEO SHARING SYSTEM

CROSS REFERENCE TO RELATED APPLICATIONS

This application is a continuation of prior, co-pending U.S. patent application Ser. No. 14/154,953, filed on Jan. 14, 2014 and entitled "REAL-TIME DUPLICATE DETECTION OF VIDEOS IN A MASSIVE VIDEO SHARING SYSTEM," which is incorporated herein by reference in its entirety.

TECHNICAL FIELD

This disclosure generally relates to real time detection of duplicate media items in a massive media hosting system and/or altering data describing detected duplicate media items in a media hosting system.

BACKGROUND

The proliferation of available media content is increasing at exponential levels that will soon reach many millions if not billions of such viewable media content. With the ubiquitous nature of media creation and publishing tools, individuals are able to become productive content creators. This has resulted in exceptional growth of available media content.

With the growth of available media content, it is inevitable that duplicate media items or portions of media items are uploaded to websites. Conventionally, detecting duplicate media items includes a direct comparison of the media items. Manual analysis of media content is highly inefficient considering the large body of available media content.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to detecting duplicate media items in a massive media item system. A digest component can generate a digest, of a determined length, based on at least a portion of a fingerprint of a media item. The fingerprint represents a set of sub-fingerprints that compactly describe at least a portion of a media item or features of the media item. An indexing component can index the digest into a set of index keys. A lookup component can determine a set of references corresponding to a plurality of media items that match to the media item based on the set of index keys. A matching component can determine a set of matching media items by vetting the set of references.

Other embodiments relate to methods for real time and/or near real time detection of duplicate media items in a massive media item system. For example, a server that distributes user-broadcasted media content. Fingerprints for various segments of the media content can be transformed into digests. The digests can be indexed and potential matching media items can be identified based on a comparison of indexes. If candidate media items are identified, sufficient matches between the candidate media items and a media item being matched can be identified based upon a policy. If sufficient matches are identified, a data associated with duplicate media items can be altered.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
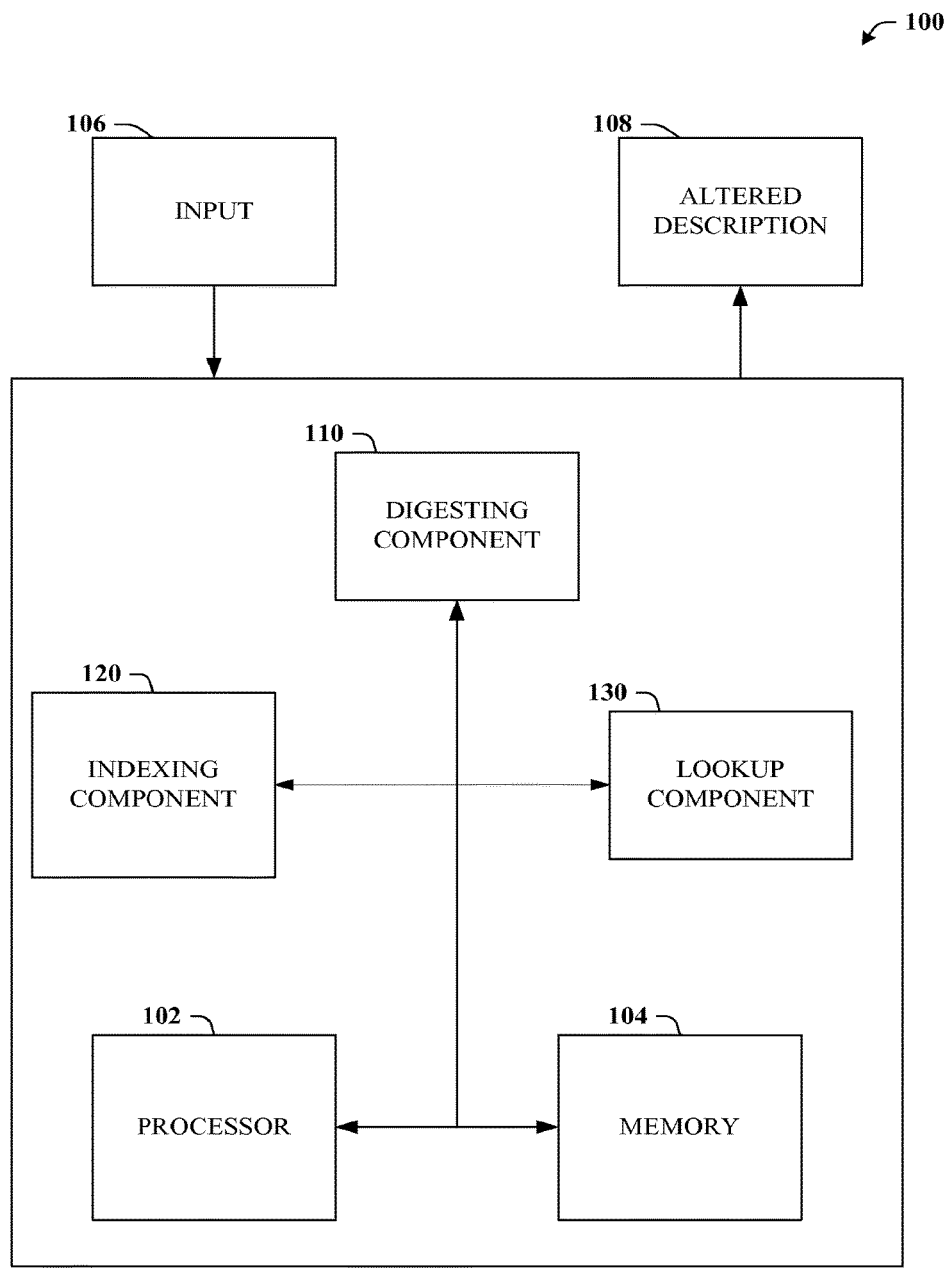
FIG. 1 illustrates a high-level block diagram of an example system that can detect duplicate media items in accordance with certain embodiments of this disclosure.

Various aspects or features of this disclosure are described with reference to the drawings, wherein like reference numerals are used to refer to like elements throughout. In this specification, numerous specific details are set forth in order to provide a thorough understanding of this disclosure.

It should be understood, however, that certain aspects of disclosure may be practiced without these specific details, or with other methods, components, materials, etc. In other instances, well-known structures and devices are shown in block diagram form to facilitate describing this disclosure.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server. Moreover, one or more implementations described herein can provide for anonymizing collected, received, or transmitted data.

In accordance with one or more implementations described in this disclosure, a duplicate media item detection system can detect duplicate media items in real-time or near real-time. Media items can comprise video, audio, text, and/or a combination of the above. The duplicate media item detection system can alter descriptors of identified duplicate media items, reduce cost of search results, and control copying of media items. In a media item service, detection of duplicates can reduce cost and increase overall efficiency of a system.

A digesting component can generate a digest of a media item based on a fingerprint of a media item. A fingerprint can represent a compact descriptor or set of descriptors of a media item. For example, a fingerprint can be generated based on sets of groupings of interest points that meet threshold criteria. The fingerprint ("compact descriptors") can be used in identifying a potential media item match. One method of calculating fingerprints is to first calculate individual interest points that identify unique characteristics of local features of the time-frequency representation of the reference sample. Fingerprints can then be computed as functions of sets of interest points. Fingerprints of a media item can then be compared to fingerprints of reference samples to determine identity of the media item. However, in massive media sharing systems direct comparison of fingerprints can be impractical, time consuming, and costly. Fingerprints can be of variable length. In an aspect, the digest component can generate a digest by compacting or collapsing the variable length fingerprints into a fixed size. A digest can represent a fingerprint of a determined length.

An indexing component can index digests. Indexing can comprise dividing the digest into a set of fixed length snippets or pieces. Each piece can represent an index key. An identifier of the media item can be appended to each of the index keys. A lookup component can detect matched media items based on the index keys. The matched media items can be vetted to determine whether a duplicate exists.

In an example, a video can be uploaded (e.g., to a server). A duplicate detection system can determine if a duplicate exists by comparing index keys and vetting any matches. As a result of identifying the duplicate, the video can be associated with descriptors of the duplicated (e.g., clusters, classifiers, meta-data, original authors, and the like). Various other aspects are described in more detail herein.

While the various components are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other.

Referring now to FIG. 1, a system 100 is depicted. System 100 can detect duplicate media items and alter descriptive data of duplicate media items. Embodiments disclosed herein, for example, can detect duplicate media items in real-time and/or near real time and alter descriptive data such as clusters, classifiers, meta-data, and the like. Such can enable additional features and improve user satisfaction, and can be particularly useful in massive media systems. System 100 can include a memory 104 that stores computer executable components and a processor 102 that executes computer executable components stored in the memory 104. It is to be appreciated that the system 100 can be used in connection with implementing one or more of the systems or components shown and described in connection with other figures disclosed herein. It is noted that all or some aspects of system 100 can be comprised in larger systems such as servers, computing devices, smart phones, and the like. As depicted, system 100 can include a digest component 110 (which can generate digests), an indexing component 120 (which can index a digest), and a lookup component 130 (which can identify candidate media items).

System 100 can receive input 106 as a media item or a set of descriptors of a media item (e.g., a fingerprint and/or a portion of a fingerprint). It is noted that system 100 can generate a fingerprint based on the input 106. The fingerprint can represent a sequence of sub-fingerprints that can be feature vectors relating to a video. In an aspect, the fingerprint (e.g., sequence of sub-fingerprints) can be fixed or variable length depending on the length of the media item. For example, a user can upload a video to a server that comprises system 100. System 100 can generate a fingerprint of the media item to identify a possible duplicate.

Figure 2:
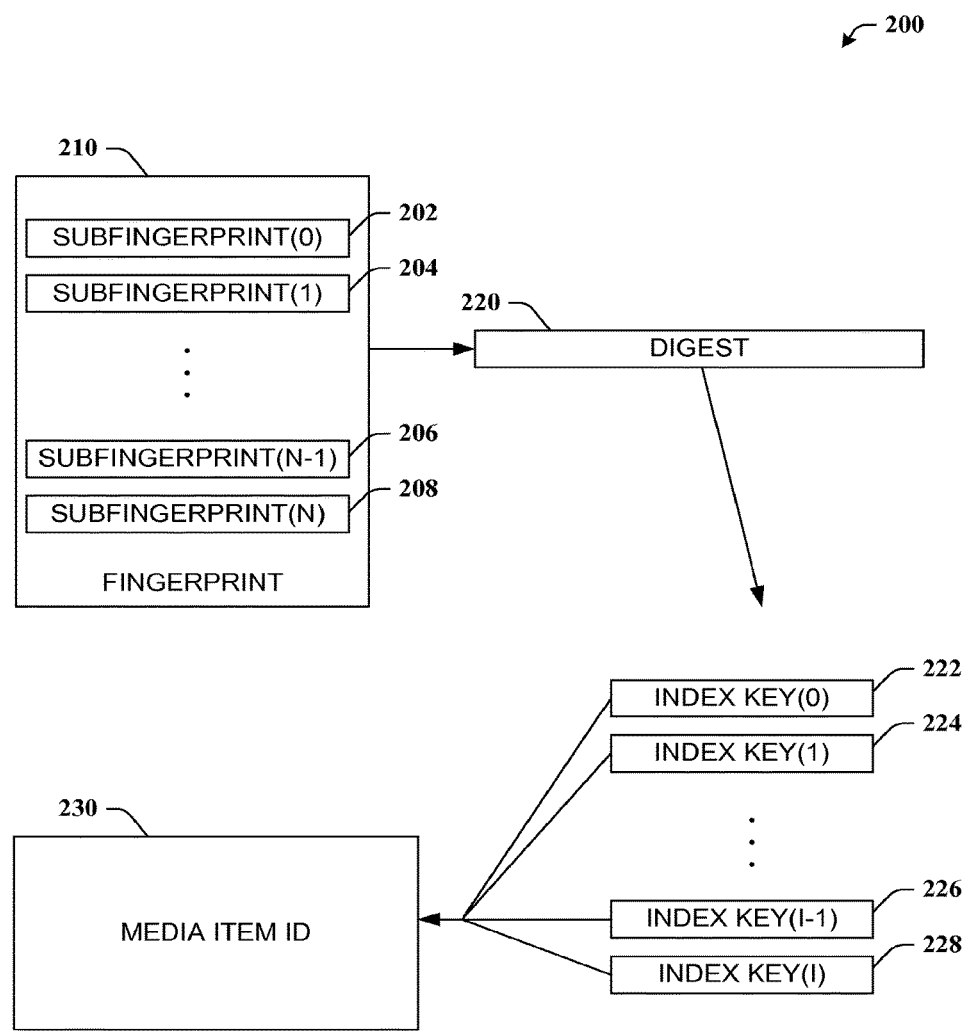
FIG. 2 illustrates a high-level block diagram of a system that can detect duplicate media items including indexing a media item in accordance with certain embodiments of this disclosure.

Turing to FIG. 2, with reference to FIG. 1, there depicted is an illustrative example of a duplicate detection system. The digest component 110 can generate a digest based on a fingerprint 210 and/or a set of n sub-fingerprints (102-108), where n is a number. In an aspect, digest component 110 can collapse and/or consolidate the fingerprint 210 (e.g., a set of sub-fingerprints of the fingerprint) to a digest fingerprint 220 having a determined size. It is noted that the determined size can be appropriately determined based on a preferred size (e.g., 2048 bytes). In another implementation, the digest component 110 can determine a range of sizes. For example, if a size of the fingerprint is within a first range, the digest component 110 can compact the fingerprint into a digest of a first determined size. Continuing with the example, if the size of the fingerprint 210 is within a second range, the digest component 110 can compact the digest 220 into a digest of a second determined size.

In an aspect, the digest component 110 can generate the digest according to various algorithms. For example, a digest could be computed from the full fingerprint using locality sensitive hashing (LSH), for such as min-wise independent permutations locality sensitive hashing scheme (MinHash), or a similarity hash (SimHash). It is noted that the above algorithms are provided for explanation and various implementations can use other algorithms.

The indexing component 120 can receive the digest 220 and index the digest. Indexing the digest can comprise dividing the digest 220 into a set of i index keys (222-228), where i is a number. Index keys 222-228 can comprise a set of bytes of the digest. In another implementation, the indexing component 120 can append a digest offset to each index key 222-228 that describes a relative position of each index key 222-228. For example, a digest comprised of 2048 bytes can be divided into 256 eight-byte pieces. Each piece can be appended with a one bit offset to produce 256 nine-byte pieces or index keys 222-228. It is appreciated that a digest can be divided a number of ways (e.g., into four-byte pieces, 16 byte pieces, etc.). It is further appreciated the any number of bytes can be appended to the pieces to describe an offset (e.g., a two byte offset, a four byte offset, etc.).

In another implementation, the indexing component 120 can index the digest 220 by associating an identifier ("ID") 230 of a media item to each index key 222-228. The media item ID 230 can comprise data uniquely identifying the media item. In an example, the indexing component 120 can generate 256 index keys 222-228 each associated with the media item ID 230 for the media item that corresponds to the digest. It is noted that associating the media item ID 230 to the index keys 222-228 can comprise appending the ID 230 and/or otherwise linking the ID 230 to the index keys 222-228.

The lookup component 130 can receive one or more index keys. The lookup component 130 can look up stored index keys, for example from memory 104. The lookup component 130 can determine matched index keys as candidate index keys. In an implementation, the lookup component 130 can determine the candidate index keys based on a threshold. For example, the lookup component 130 can determine candidate index keys based on the candidate keys meeting a determined distance from the index keys. A distance can represent a level of difference between the index keys and the looked up index keys. In another implementation, the lookup component 130 can select the candidate keys as the keys with the shortest distance from the index keys. It is noted that the lookup component 130 can store the candidate keys in a memory.

In an implementation, the lookup component 130 can generate a list of candidate keys for each index key. For example, the lookup component 130 can lookup keys for a set of 256 index keys associated with a digest to generate 256 lists of candidate index keys.

The lookup component 130 can determine candidate videos based on the matched candidate keys. In one implementation, the lookup component 130 can determine the candidate videos based on a number of candidate keys associated with each video. For example, a first video can be associated with 100 matched keys and a second candidate video can be associated with 200 matched keys. In another aspect, the component 130 can determine the candidate videos based on data such as relevance (difference between the base index keys and the candidate keys), data describing the video (e.g., meta-data, etc.), and the like. It is noted that one or more lookup components 130 can each generate sets of candidate index keys and/or videos and the sets can be merged to generate another list of candidate index keys and/or videos.

In implementations, the lookup component 130 can select a portion of the candidate videos for comparison. In an aspect, the comparison can be a more detailed comparison such as a comparison of detailed descriptors, fingerprints, metadata, and the like. In an aspect, the lookup component 130 can select a determined number of candidate videos for detailed comparison (e.g., "vetting"). The determined number can be any number and/or percentage of videos. For example, the lookup component 130 can select the 100 best candidates, the top 20 percent of best candidates, candidates within a certain threshold distance from the based video (e.g., candidate videos within a range of difference or similarity), or the like. It is noted that the lookup component 130 can determine that no candidates should be vetted and that a duplicate does not exist. It is further noted that the lookup component 130 can receive input 106, as user input, to vet selected videos.

Figure 3:
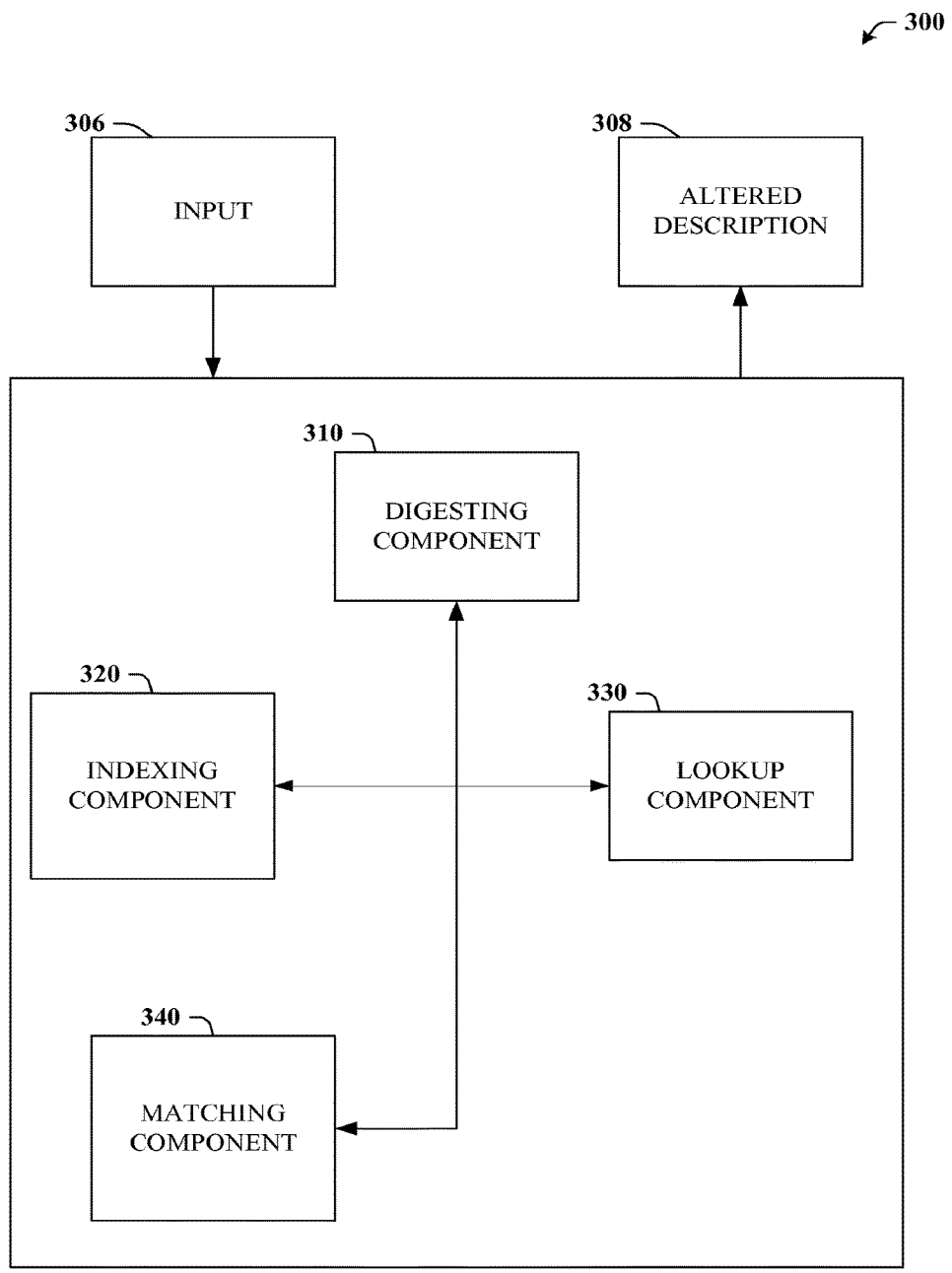
FIG. 3 illustrates a high-level block diagram of an example system that can detect duplicate media items including a matching component in accordance with certain embodiments of this disclosure.

Turning now to FIG. 3, a system 300 is depicted. System 300 can detect duplicate media items and alter descriptive data of duplicate media items including matching media items. Embodiments disclosed herein, for example, can detect duplicate media items in real-time and/or near real time and alter descriptive data such as clusters, classifiers, meta-data, and the like. System 300 can include a memory that stores computer executable components and a processor that executes computer executable components stored in the memory. It is to be appreciated that the system 300 can include various components described with reference to other systems described herein (e.g., system 100, system 200, etc.). As depicted, system 300 can include a digest component 310 (which can generate digests), an indexing component 320 (which can index a digest), a lookup component 330 (which can identify candidate media items), and a matching component 340 (which can alter descriptive data of matched media items). It is noted that digest component 310, indexing component 320, and lookup component 330 can respectively functional similarly or to digest component 110, indexing component 120, and lookup component 130.

The matching component 340 can receive a set of candidate media items from the lookup component 330 for a received media item from input 306. The matching component 340 can analyze the set of candidate media items to determine if they match the received media item. For example, the matching component 340 can facilitate a detailed analysis of a set of candidate media items to determine if the media items match a received media items. It is noted that the matching component 340 can utilize a more detailed comparison algorithm than used by the lookup component 340.

In implementations, the matching component 340 can generate a cluster identification ("cluster ID") for the received media item. A cluster can represent a set of classifiers that describe a media item and/or set of media items. It is noted that various other nomenclatures and/or classifiers can be utilized to generate a cluster ID. As an example, a cluster ID can comprise a video ID and a time stamp, such as a current time stamp. It is further noted that a cluster ID can be selected for the media item from a set of cluster IDs of the matching media items.

In an aspect, the matching component 340 can alter a cluster ID of the received video if the received video has a cluster ID and/or can generate a new cluster ID for the received video if the video does not already have a cluster ID. For example, if a received media item is not associated with a cluster ID the matching component can copy the cluster ID of a matching media as the cluster ID of the received media item. As another example, if the received media item has a cluster ID, then the matching component can select one of the cluster IDs from a group of cluster IDs comprising the cluster ID of the received media item and cluster IDs of any matching media items. In an aspect, the matching component 340 can select the cluster ID based on a number of videos associated with the cluster ID (e.g., smallest, largest, etc.), based on time stamps (e.g., most recent, least recent, etc.), and the like.

In another aspect, the matching component 340 can correlate matched videos with descriptive data, search results, training sets for classifiers, and the like. For example, a user can search a website for a particular media item. A list of results can be generated that comprises various media items. The matching component 340 can determine if any of the media items are associated with a matched media item and can append the matched media item to the list. In another example, the matching component 340 duplicate training sets for classifiers for matched media items.

In implementations, the matching component 340 can detect abuse of system 300. In an aspect, abuse can include a user uploading copyrighted material and the like. For example, a content provided can upload a video to a video hosting site and if a copy of the video and/or a portion of the video is detected, the matching component 340 can determine that abuse of system has occurred. It is noted that the matching component 340 can reject a matched media item, alert a content provider who is associated with a media item, alert the user uploading the media item, identify a media item as potentially abusive, identify a user as potentially abusive, and the like. In an aspect, the matching component 340 can utilize thresholds to determine if a user and/or media item is associated with an abusive act. For example, the matching component 340 can identify a user as abusive if the user is associated with a threshold number of potentially abusive acts in a given time period.

Figure 4:
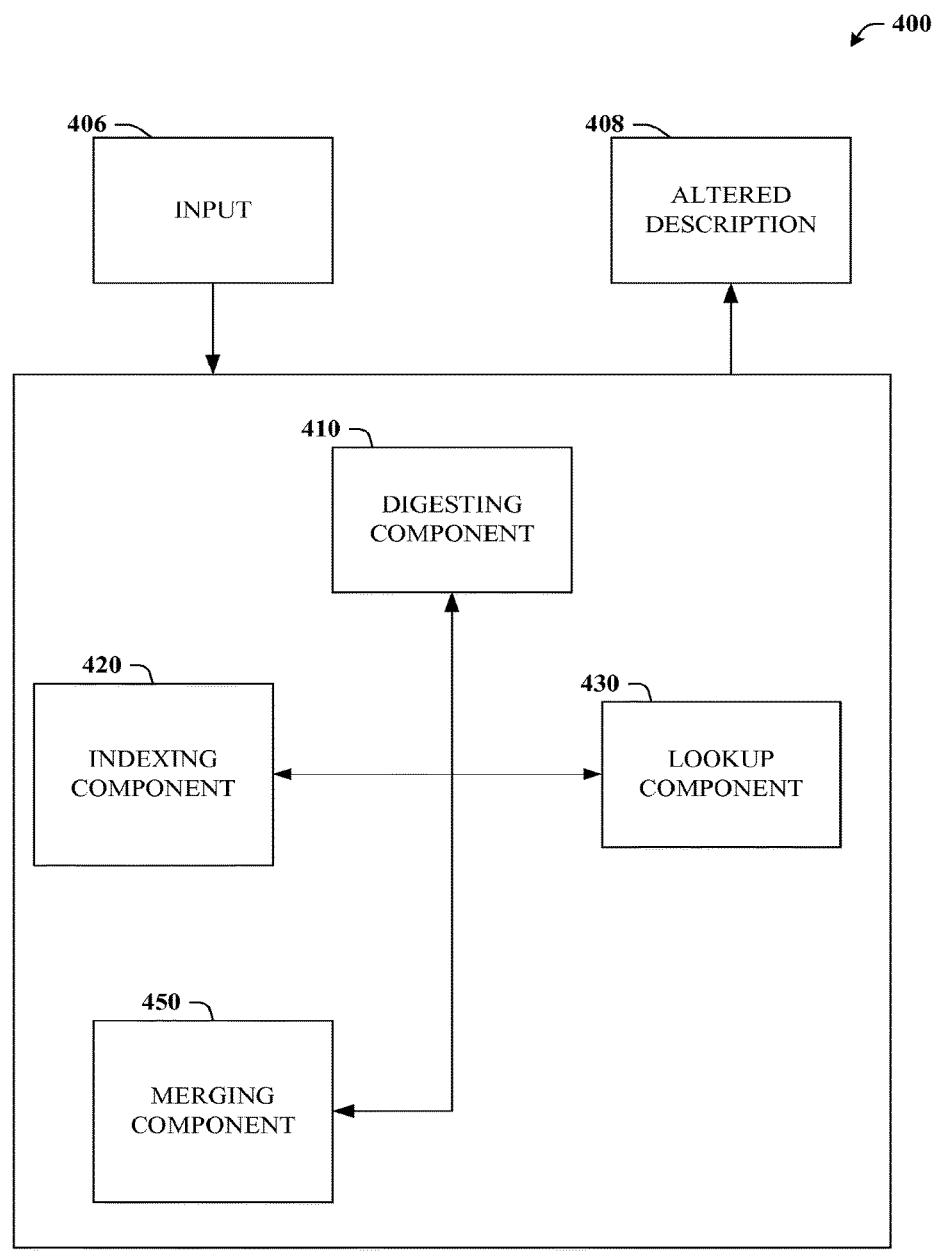
FIG. 4 illustrates a high-level block diagram of an example system that can detect duplicate media items including a merging component in accordance with certain embodiments of this disclosure.

Referring now to FIG. 4, system 400 is depicted. System 400 can relate to detection of duplicate media items in a media system. System 400 can include all or portions of systems 100-300 as described previously or other systems or components detailed herein. In addition, system 400 can include merging component 450 which can merge clusters, cluster IDs, and associated media items.

In an aspect, matched media items can comprise identical clusters, cluster IDs, and various other descriptive fields. The fields should match if they are updated as media items are matched. In another aspect, this property can break down as additional media items are matched and/or additional systems perform matching. The merging component 450 can merge cluster IDs for media items that are matched and/or associatively matched. For example, V can represent a first video and W can represent a second video. If video V matches video W then the clusters, cluster IDs, and various other identifying data should match.

The merging component 450 can identify whether matched media items comprise inconsistent descriptors (e.g., clusters, cluster IDs, etc.). It is noted that the merging component 450 can compare descriptors of matched media items and/or analyze descriptors to determine that media items are matched and that descriptors should be merged. For example, if a cluster ID of video V comprises a reference (e.g., media item ID) to video W, then the cluster ID of video W should match the cluster ID of video V. It is noted that, in the above example, the system 400 need not keep a list of matched media items and/or lookup a list of matched media items as the cluster IDs can be utilized to determine matched media items.

The merging component 450 can merge other data associated with media items that may not describe the content of the media item. For example, the merging component 450 can merge advertisements associated with media items, counts of views of a media item, performance metrics, video markers, and the like. As an example, an advertiser can pay to provide an advertisement before, after, and/or during a particular video. If a copy of the video is uploaded, the advertiser can miss the opportunity to provide the advertisement if the duplicate does not present the advertisement. The merging component 450 can identify a duplicate of the particular video selected by the advertiser and can associate the advertisement with the duplicate. In another aspect, the merging component 450 can merge performance metrics of duplicate media items. For example, system 400 can monitor and record respective counts of views of duplicate videos. The merging component 450 can merge the respective counts to determine a total number of views. It is noted that the merging component 450 can generate a report of the total number of views, number of views per duplicate, and the like.

It is noted that the merging component 450 can determine whether to merge descriptors based on stored preferences. The preferences can comprise data describing exclusive fields, data indicating descriptors of a certain media item should not be merged, and the like. For example, certain fields can be exclusive of matched media items and should not be merged, such as fields describing upload date, user associated with the upload, and the like. In implementation, a content provider can provide input 406 indicating that their media item should not be associated with merging. For example, a user may not want other copies of their media item available and/or linked to their version of the media item.

In implementations, the merging component 450 can perform merges online and/or offline. Online/offline can refer to states identifying connectivity between one or more components. In general, "online" indicates a state of connectivity, while "offline" indicates a disconnected state. In an aspect, offline merging can prevent service interruptions, end-user quality degradation, and the like.

Figure 5:
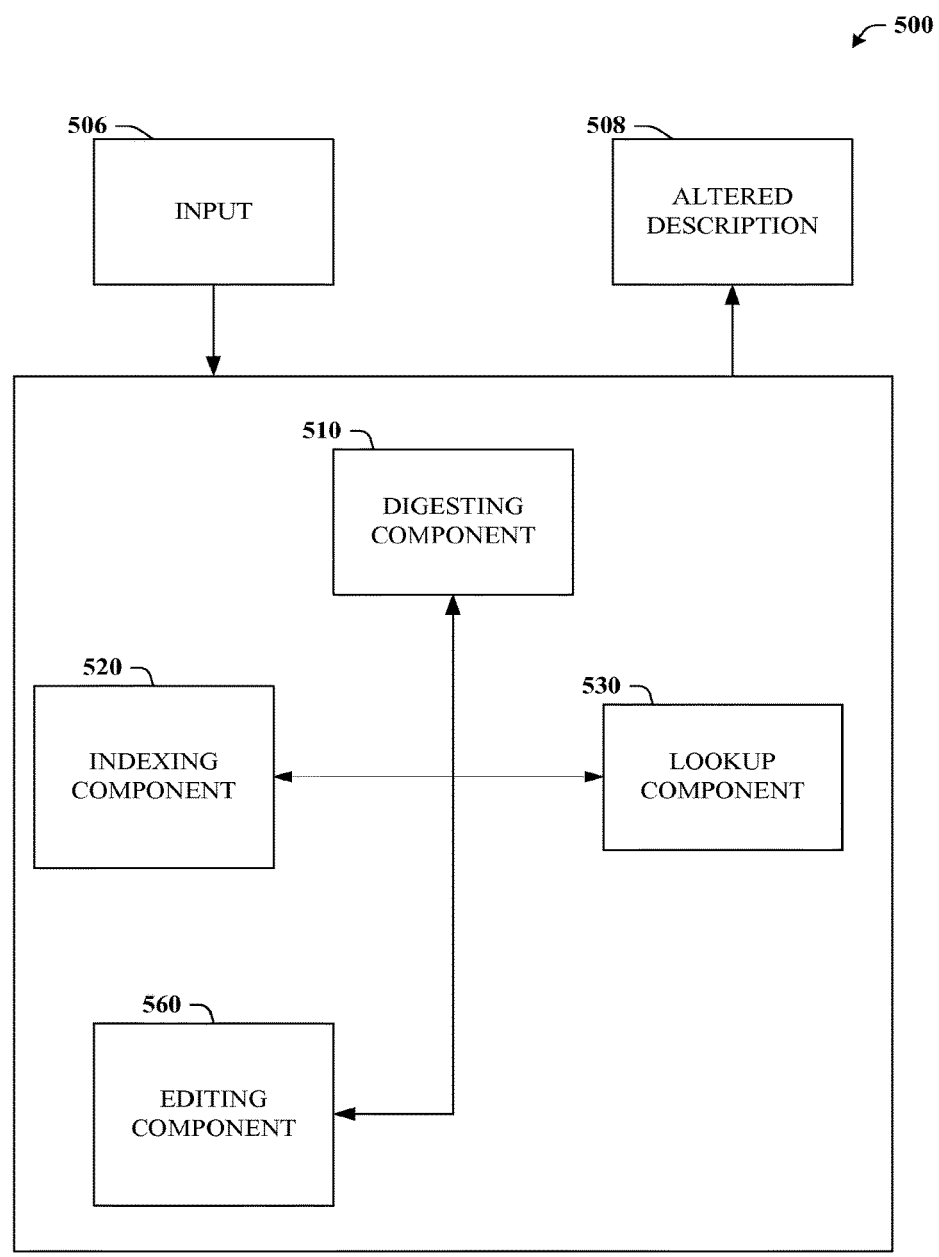
FIG. 5 illustrates a high-level block diagram of an example system that can detect duplicate media items including an editing component in accordance with certain embodiments of this disclosure.

Referring now to FIG. 5, system 500 is depicted. System 500 can relate to detection of duplicate media items in a media system. System 500 can include all or portions of systems 100-400 as described previously or other systems or components detailed herein. In addition, system 500 can include editing component 560, which can edit media items, clusters, data describing media items, and the like.

Editing component 560 can receive input 506 in the form of user provided input and the like. In an aspect, editing component 560 can receive input 506 to edit a set of matched video items (e.g., add/remove media item from a set of matched video items). For example, a user may desire a particular video to be removed from consideration, such as a video review of the user's video. The user can provide input representing the user's preference and the editing component 560 can remove the select video.

In another aspect, editing component 560 can receive input identifying a media item as a matched media item. For example, a user can upload a new video that is identical and/or substantially identical to a previously uploaded video. The user can provide input regarding the relationship with the new video and the previously uploaded video. In another aspect, the user can provide input identifying a previously uploaded media item as identical to another previously uploaded media item.

In implementations, the editing component 560 can receive data as input 506 that represents a user's preference for matching, merging, and the like. For example, a user can prefer that duplicates of their media items are not populate in search results based on the duplicate matching the user's media item. In another aspect, a user can provide input that indicates what the system 500 should do when a duplicate is found, such as alert the user, alert the uploading user, remove the duplicate, etc.

Figure 6:
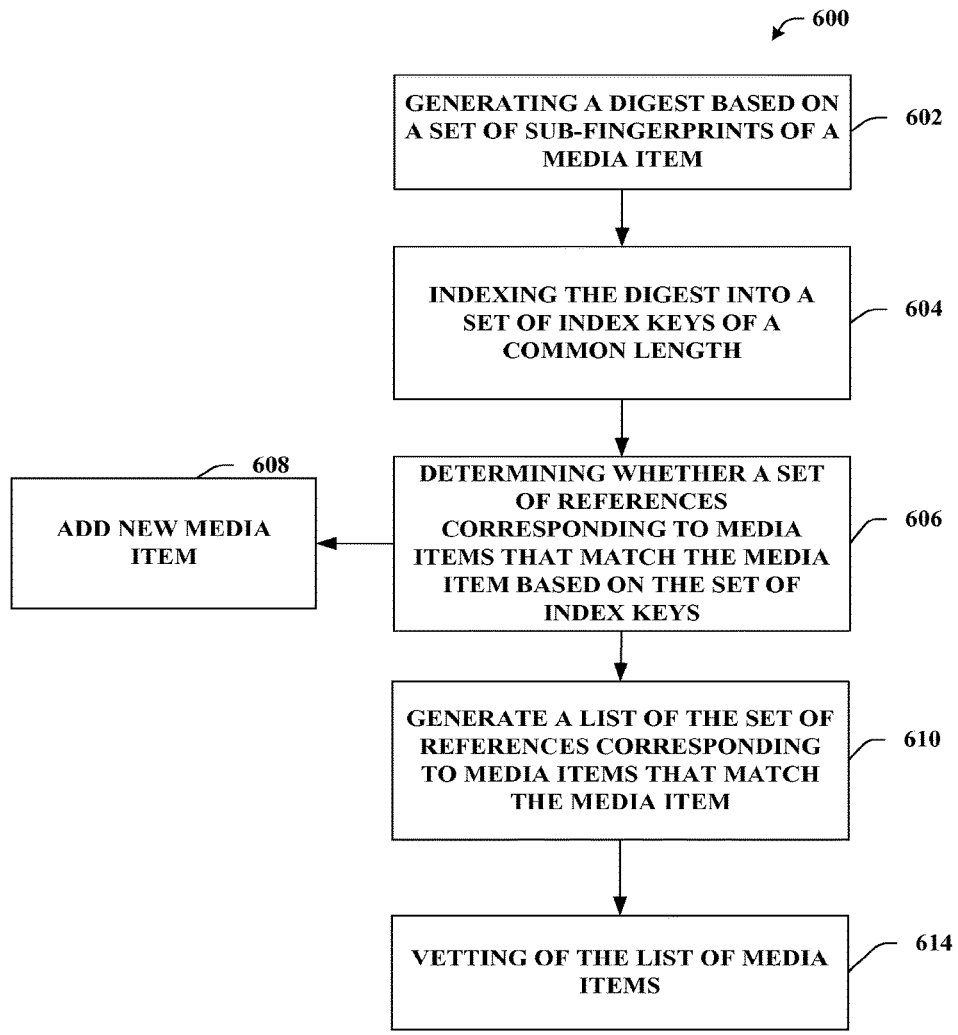
FIG. 6 illustrates an example methodology that can detect duplicate media items in a media hosting system in accordance with certain embodiments of this disclosure.
Figure 7:
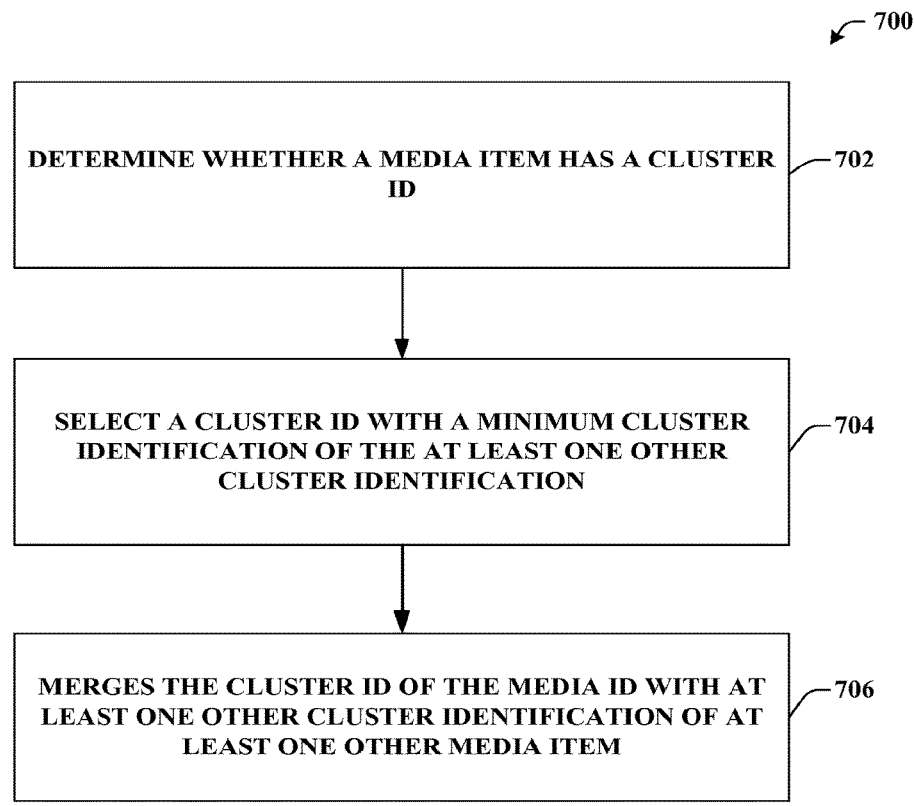
FIG. 7 illustrates an example methodology that can determine cluster identifications of detected duplicate media items in a media hosting in accordance with certain embodiments of this disclosure.
Figure 8:
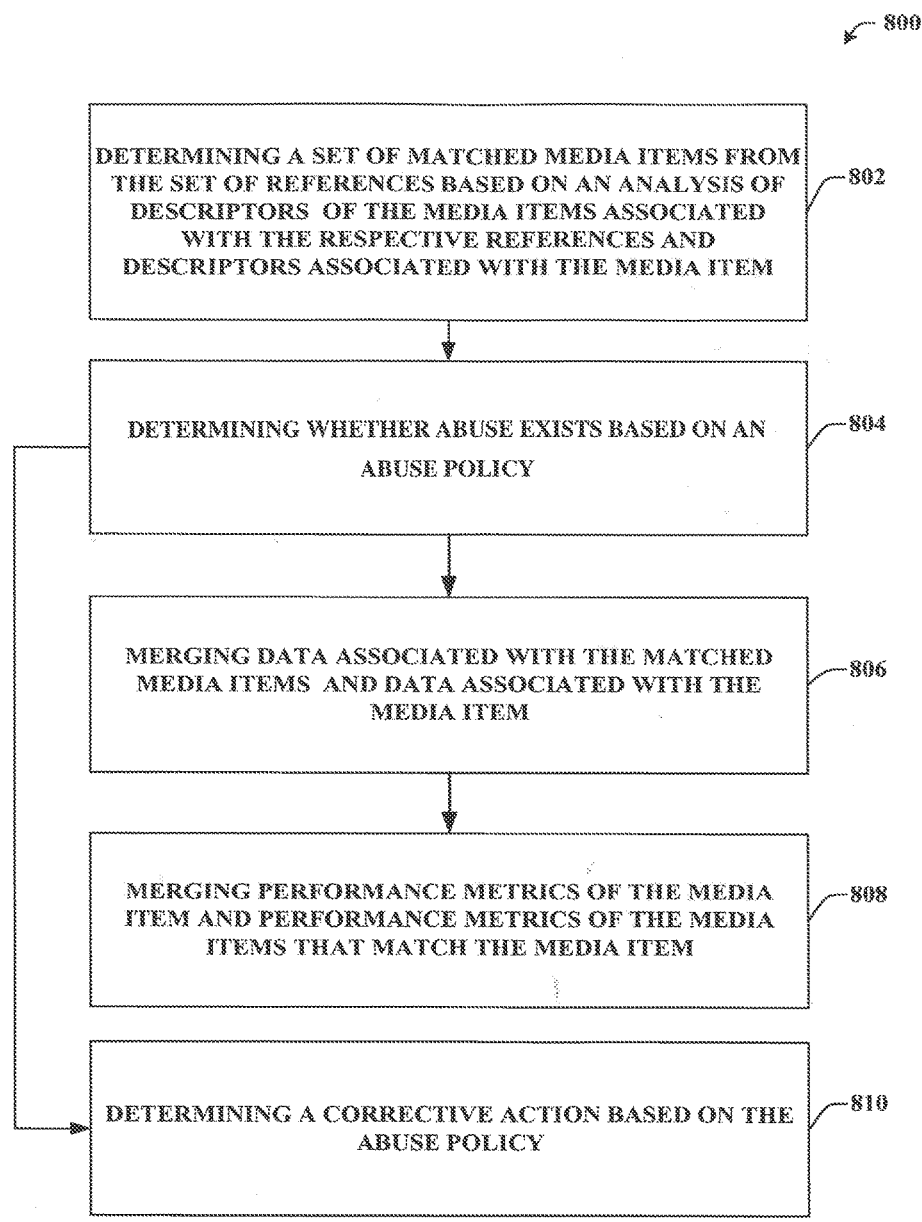
FIG. 8 illustrates an example methodology that can merge data associated with detected duplicate media items in a media hosting in accordance with certain embodiments of this disclosure.

FIGS. 6-8 illustrate various methodologies in accordance with certain embodiments of this disclosure. While, for purposes of simplicity of explanation, the methodologies are shown media a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media. It is noted that the methods depicted in FIGS. 6-8 can be performed by various systems disclosed herein, such as systems 100, 200, 300, 400 and 500.

FIG. 6 illustrates exemplary method 600. Method 600 can provide for detecting duplicate media items in a massive media sharing system. For example, at reference numeral 602, a system can generate (e.g., via digesting component 110) a digest based on a set of sub-fingerprints of a media item. The set of sub-fingerprints may comprise an entire fingerprint and/or a portion of a fingerprint. Generating the digest can include compacting the set of sub-fingerprints into a set of descriptors having a determined length.

At 604, a system can index (e.g., via indexing component 120) the digest into a set of index keys of a common length. Indexing the digest can include diving the digest into a determined number of portions having determined lengths. It is noted that the portions can be of equal length and/or of variable lengths. In another aspect, indexing the digest can include appending an offset or marker to each portion. The offset can be one or more bits that indicate a relative position of each portion.

At 606, a system can determine (e.g., via lookup component 130) if a set of references corresponding to media items match the media item based on the set of index keys. The references can be representations of media items (e.g., index keys of various media items). Determining whether the references match the media item can include determining a difference metric between references and index keys. If no matches are found, then at 608, a system can add (e.g., via lookup component 130) the media item as a new media item.

At 610, in response to determining matches, a system can generate (e.g., via lookup component 130) a list of the set of references corresponding to media items that match the media item. The list can comprise a number of identifiers that identify matched media items. It is noted that the list can be stored in a memory.

At 612, a system can vet (e.g., via matching component 340) the list of media items to determine if a duplicate media item exists. Vetting can include performing a detail comparison of the matched media items to determine if a duplicate exits. It is noted that various algorithms can be utilized to compare the media items.

Turning now to FIG. 7, exemplary method 700 is depicted. Method 700 can provide for detection of duplicate media items and merging of cluster IDs. At reference numeral 702, a system can determine (e.g., via matching component 340) whether a media item has a cluster ID. As an example, a newly added media item may not have a cluster ID while a previously added media item does have a cluster ID.

At 704, a system can select (e.g., via matching component 340) as the cluster identification for the duplicate media items, a cluster ID with a minimum or maximum value. A value can be determined based on a timestamp associated with the cluster idea. In another aspect, the value can be determined based on an analysis of the cluster IDs as long as the cluster ID is consistently chosen.

At 706, a system can merge (e.g., via merging component 450) the cluster ID of the media item with at least one other cluster ID of at least one other media item. Merging can include setting a selected cluster ID for all duplicates, generating a new cluster ID for all duplicates, and the like.

Turning now to FIG. 8, example method 800 is illustrated. Method 800 can provide for duplicate media item detection and merging of data associated with duplicate media items. At 802, a system can determine (e.g., via matching component 340) a set of matched media items from a set of references based on an analysis of descriptors of a media items associated with the respective references and descriptors associated with a media item. In an aspect, the matched media items can be identified as duplicate media items.

At 804, a system can determine (e.g., via matching component 340) whether abuse exits based on an abuse policy. Abuse can be determined based on a metric such as a number of duplicates associated with a user, a copyright associated with a duplicate media item, and the like. If abuse is detected, at 810, a system can determine (e.g., via matching component 340) a corrective action based on the abuse policy. For example, a corrective action can involve deletion of a duplicate, flagging of a duplicate and/or user associated with a duplicate, suspension of a user, generating an alert, and the like.

At 806, a system can merge (e.g., via merging component 450) data associated with the matched media items and data associated with the media item. For example, the data can comprise meta data, classifiers, creators, copyright holders, and the like.

At 808, a system can merge (e.g., via merging component 450) performance metrics of the media item and performance metrics of the matched media items. Performance metrics can include number of views, number of links associated with the media items, and the like. Merging can comprise generating a summary of the performance metrics.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
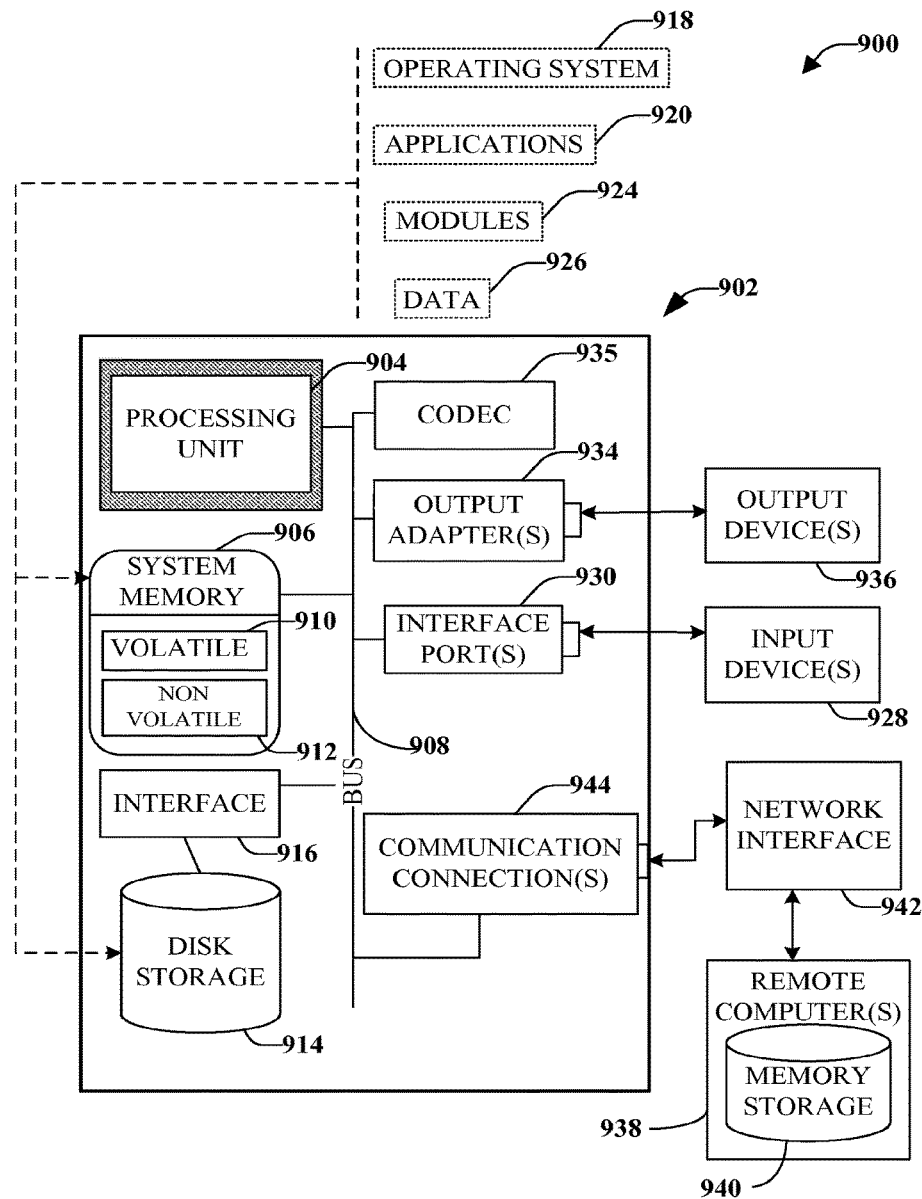
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. For example, in one or more embodiments, all or portions of codec 935 can be included in encoding component 118 and/or decoding component 514. Although, codec 935 is depicted as a separate component, codec 935 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can he provided the opportunity to opt—in or opt—out of having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
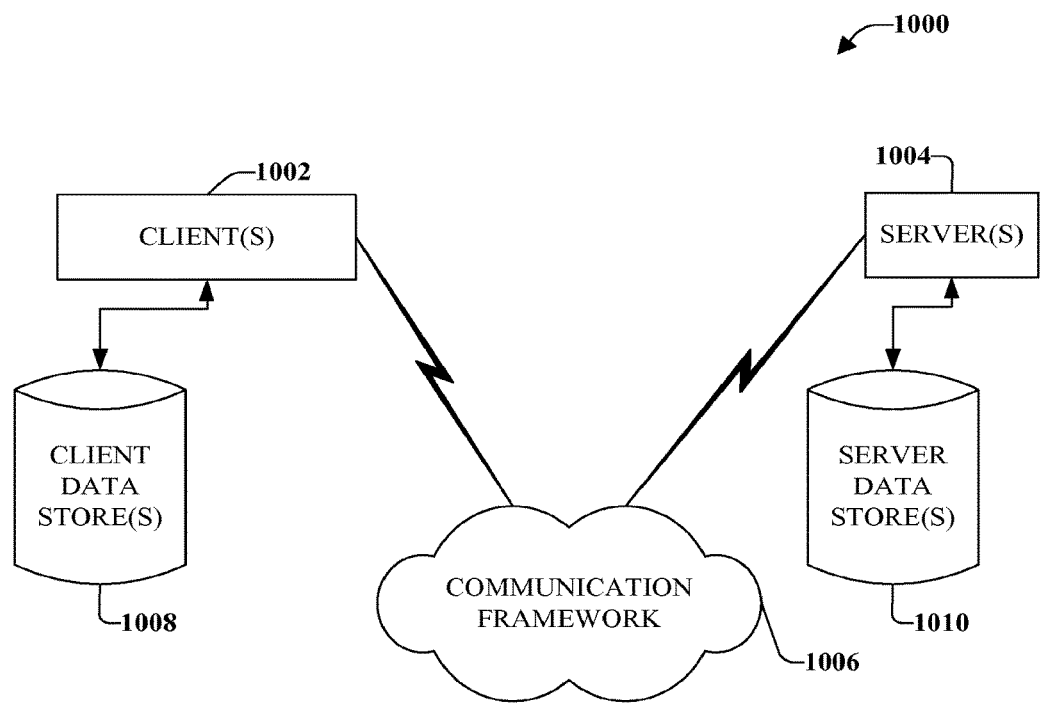
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims.

Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system comprising:
    a memory that has stored thereon computer executable components; and
    a processor that executes the following computer executable components stored in the memory:
        a digest component that generates a digest based on at least a portion of a fingerprint of a first media item, the digest having a determined size;
        an indexing component that indexes the digest into a first set of index keys;
        a lookup component that determines whether a second media item matches the first media item based on comparing the first set of index keys with a second set of index keys corresponding to the second media item; and
        a matching component that, in response to the lookup component determining that the second media item matches the first media item, determines a cluster identification for the first media item based on one or more cluster identifications of the second media item.

2. The system of claim 1, further comprising a merging component that merges the cluster identification of the first media with the cluster identification of the second media item.

3. The system of claim 1, wherein the determined size of the digest is independent of a size of the fingerprint.

4. The system of claim 1, wherein the first set of index keys comprises a corresponding set of bytes of the digest.

5. The system of claim 1, further comprising a lookup component that generates, in response to determining the first media item does not have a cluster identification, a new cluster identification.

6. The system of claim 1, further comprising a fingerprint component that generates the at least a portion of the fingerprint of the first media item.

7. The system of claim 1, wherein each of the index keys has a common respective length.

8. The system of claim 1, further comprising a merging component that:
    determines whether descriptors associated with the first media item are inconsistent with descriptors associated with the second media item; and
    responsive to determining that the descriptors associated with the first media item are inconsistent with the descriptors associated with the second media item, merges the descriptors associated with the first media item with the descriptors associated with the second media item.

9. The system of claim 1, wherein the matching component determines that a third media item matches the first media item based on the determined cluster identification of the first media item matching a cluster identification of the third media item.

10. The system of claim 1, wherein the matching component determines that a third media item does not match the first media item based on the determined cluster identification of the first media item not matching a cluster identification of the third media item.

11. A method comprising:
    generating a digest based on at least a portion of a fingerprint of a first media item, the digest having a determined size;
    indexing the digest into a first set of index keys, each of the index keys;

determining whether a second media item matches the first media item based on comparing the first set of index keys with a second set of index keys corresponding to the second media item; and in response to the lookup component determining that the second media item matches the first media item, determining a cluster identification for the first media item based on one or more cluster identifications of the second media item.

12. The method of claim 11, further comprising merging the cluster identification of the first media with the cluster identification of the second media item.

13. The method of claim 11, further comprising generating, in response to determining the first media item does not have a cluster identification, a new cluster identification.

14. The method of claim 11, further comprising:

determining whether descriptors associated with the first media item are inconsistent with descriptors associated with the second media item; and responsive to determining that the descriptors associated with the first media item are inconsistent with the descriptors associated with the second media item, merging the descriptors associated with the first media item with the descriptors associated with the second media item.

15. The method of claim 11, further comprising determining that a third media item matches the first media item based on the determined cluster identification of the first media item matching a cluster identification of the third media item.

16. The system of claim 11, further comprising determining that a third media item does not match the first media item based on the generated cluster identification of the first media item not matching a cluster identification of the third media item.

17. A computer readable storage medium comprising instructions that when executed cause a system comprising a processor to perform operations, comprising:

generating a digest based on at least a portion of a fingerprint of a first media item, the digest having a determined size;

indexing the digest into a first set of index keys, each of the index keys;

determining whether a second media item matches the first media item based on comparing the first set of index keys with a second set of index keys corresponding to the second media item; and in response to the lookup component determining that the second media item matches the first media item, determining a cluster identification for the first media item based on one or more cluster identifications of the second media item.

18. The computer readable storage medium of claim 17, further comprising merging the cluster identification of the first media with the cluster identification of the second media item.

19. The computer readable storage medium of claim 17, further comprising generating, in response to determining the first media item does not have a cluster identification, a new cluster identification.

20. The computer readable storage medium of claim 17, further comprising determining that a third media item matches the first media item based on the determined cluster identification of the first media item matching a cluster identification of the third media item.

* * * * *